(12) United States Patent
Jerolm

(10) Patent No.: US 10,985,941 B2
(45) Date of Patent: Apr. 20, 2021

(54) INITIALIZATION OF A LOCAL BUS

(71) Applicant: WAGO Verwaltungsgesellschaft mbH, Minden (DE)

(72) Inventor: Daniel Jerolm, Bad Essen (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 24 days.

(21) Appl. No.: 16/694,465

(22) Filed: Nov. 25, 2019

(65) Prior Publication Data

US 2020/0092131 A1 Mar. 19, 2020

Related U.S. Application Data

(63) Continuation of application No. PCT/EP2018/062925, filed on May 17, 2018.

(30) Foreign Application Priority Data

May 24, 2017 (DE) .................... 10 2017 208 823.0

(51) Int. Cl.
*H04L 12/28* (2006.01)
*H04L 12/403* (2006.01)
*H04L 12/40* (2006.01)
*H04L 12/423* (2006.01)

(52) U.S. Cl.
CPC ...... *H04L 12/403* (2013.01); *H04L 12/40019* (2013.01); *H04L 12/423* (2013.01); *H04L 2012/4026* (2013.01)

(58) Field of Classification Search
None
See application file for complete search history.

(56) References Cited

U.S. PATENT DOCUMENTS

| 5,472,347 | A | 12/1995 | Nordenstrom et al. |
| 6,263,396 | B1 * | 7/2001 | Cottle ............... H04N 21/43632 710/263 |
| 2002/0040452 | A1 | 4/2002 | Birk et al. |
| 2004/0172430 | A1 | 9/2004 | Hornung |
| | | | (Continued) |

FOREIGN PATENT DOCUMENTS

| DE | 195 45 566 A1 | 6/1997 |
| EP | 1 193 916 A2 | 4/2002 |
| EP | 1 431 714 A1 | 6/2004 |

*Primary Examiner* — Elisabeth Benoit Magloire
(74) *Attorney, Agent, or Firm* — Muncy, Geissler, Olds & Lowe, P.C.

(57) ABSTRACT

A method is described for communicating with data bus subscribers connected to a local bus, in particular a ring bus, with a local bus master, the method comprising sending a first data packet from the local bus master to all data bus subscribers for counting communication-ready data bus subscribers in a sequence, wherein the first data packet has a first counter value that is read out from each of the communication-ready data bus subscribers is changed in order; and sending a plurality of second data packets from the local bus master to all data bus subscribers, wherein the number of second data packets is based on the first counter value and wherein each of the second data packets is assigned to one of the communication-ready data bus subscribers based on the respective relative position of the communication-ready data bus subscribers in the sequence.

15 Claims, 9 Drawing Sheets

(56) References Cited

U.S. PATENT DOCUMENTS

| | | | |
|---|---|---|---|
| 2006/0120393 A1* | 6/2006 | Lee, II | H04L 47/15 |
| | | | 370/412 |
| 2006/0267992 A1* | 11/2006 | Kelley | G06F 9/30072 |
| | | | 345/502 |
| 2014/0325104 A1* | 10/2014 | Rohatschek | G06F 13/4256 |
| | | | 710/110 |
| 2016/0239446 A1* | 8/2016 | Su | H01L 23/49838 |
| 2017/0046292 A1* | 2/2017 | Teuke | H04L 12/40169 |
| 2019/0146940 A1* | 5/2019 | Fuchs | G06F 13/24 |
| | | | 710/113 |
| 2020/0050571 A1* | 2/2020 | Bhaskar | G06F 1/10 |

* cited by examiner

INITIALIZATION OF A LOCAL BUS

This nonprovisional application is a continuation of International Application No. PCT/EP2018/062925, which was filed on May 17, 2018, and which claims priority to German Patent Application No. 10 2017 208 823.0, which was filed in Germany on May 24, 2019, and which are both herein incorporated by reference.

BACKGROUND OF THE INVENTION

Field of the Invention

The present invention relates to the initialization of a local bus, in particular to querying information in a local bus by means of relative addressing.

Description of the Background Art

Bus systems and in particular local bus systems have become an indispensable part of today's automation systems. Automation systems are used in particular for controlling industrial plants, buildings and means of transport. Usually, a plurality of sensors and actuators are required in order to control an automation system. These sensors and actuators monitor and control the process that the system carries out. These different sensors and actuators of an automation system are often referred to as automation devices.

These automation devices may either be connected directly to a controller of the automation system, or may first be connected to input and output modules, often referred to as I/O modules. These may in turn be connected directly to the controller. These automation devices may either be integrated directly into the I/O modules or may be connected to them via a wired or wireless connection.

The control of an automation system is usually accomplished using one or more programmable logic controllers (PLCs). The PLCs may be arranged hierarchically or decentrally in an automation system. There are different performance classes for the PLCs, so that they may be subject to different controls and rules depending on the computing and memory capacity. In the simplest case, a PLC has inputs, outputs, an operating system (firmware) and an interface via which a user program may be loaded.

The user program determines how the outputs are switched as a function of the inputs. The inputs and outputs may be connected to the automation devices and/or the I/O modules, and the logic stored in the user program may be used to monitor or control the process that the automation system performs. The sensors provide monitoring of the process and the actuators provide control of the process. The controller may also be referred to as a central controller or central unit and controls at least one automation device or I/O module connected to the controller.

However, directly connecting the automation devices with at least one controller or the I/O modules with at least one controller in the form of parallel wiring, i.e. running a line from each automation device or each I/O module to the higher-level controller, is very time-consuming. Especially with the increasing degree of automation of an automation system, the cabling effort increases in the case of parallel wiring. This involves a great deal of effort in project planning, installation, commissioning and maintenance.

For this reason, bus systems are presently usually used in automation technology that allows connecting the automation devices or the I/O modules to the controller. In order to further simplify the connection of the individual automation devices or I/O modules with the bus system, currently, individual groups of automation devices or I/O modules are often first connected to each other to form a local bus system using a specialized local bus, and then at least one subscriber of this local bus is connected to the bus system that is connected to the controller. In this case, the local bus system may differ from the bus system that is used to establish the connection with the control system.

In a group of local bus subscribers, the subscriber that is connected to the bus system of the controller is often referred to as a local bus master. Alternatively, the term "head-end station" of the local bus system is also used.

In contrast to the other local bus subscribers, this local bus master may contain additional logics, circuits or functionalities that are necessary for connecting to the bus system of the controller. The local bus master itself may also contain a PLC. This subscriber may also have logics and circuits for conversion between the two bus systems. The local bus master accordingly may also be designed as a gateway or bus converter, and ensures that the data available in the format of one bus system is converted into the format of the local bus system and vice versa. Usually, but not necessarily, the local bus master is specialized for connecting the local bus to the higher-level bus.

The local buses that are used are typically adapted to the special usage requirements of the automation devices or I/O modules, or take into account the specific hardware design thereof. In this case, the groups of automation devices or I/O modules of the local bus system usually form a subgroup of the automation system for executing a specific task in the process that the automation system carries out. The data exchanged on the buses for the process is often referred to as local bus data or process data, because this data contains information for regulating or controlling the process that the automation system carries out. This data may comprise, among other things, measurement data, control data, status data and/or other information. Depending on the bus protocol used, this data may be prepended ("header") or appended ("tail") to other data. This other data may contain information regarding the data, or information regarding internal communication on the local bus. In this case, a multiplicity of different information is known that may be prepended or appended to the data depending on the bus protocol used. The local bus subscribers connected to a local bus may also be referred to as data bus subscribers because they exchange data on the local bus. A data bus subscriber may be used to control or monitor a process, in particular by outputting control signals, for example to actuators, and/or by receiving measurement signals, for example from sensors. The data bus subscriber converts the control signals and/or measurement signals into process data for the local bus, or vice versa.

The data bus subscribers may also be referred to as local bus subscribers.

A ring bus is a specialized form of such a local bus, as is known for example from U.S. Pat. No. 5,472,347 A. In a ring bus, the data bus subscribers, for example the automation devices or I/O modules, are each respectively connected to their directly adjacent data bus subscribers, and data is forwarded in sequence from one data bus subscriber to another. The data transmitted on the local bus may also be referred to as local bus data. Thus, the data is not sent to all data bus subscribers simultaneously, but in sequence, with a data bus subscriber receiving data from its upstream data bus subscriber and forwarding data to its downstream data bus subscriber. Between receiving the data and forwarding it, the data bus subscriber may process the received data. When the data has reached the last data bus subscriber in the sequence, the data from the last data bus subscriber is returned back to the first data bus subscriber. The return may take place via all data bus subscribers or by bypassing them via a bypass line. The ring bus thus has a downstream flow and an upstream flow of data. The data in a ring bus is usually transmitted in the form of data packets that pass through all data bus subscribers.

For sending to specific data bus subscribers, data packets are furnished with an address that corresponds to the data bus subscriber, so that the data bus subscriber that has the corresponding address is informed that the data packet is directed to this data bus subscriber. In the prior art, in ring buses, the data bus subscribers are frequently addressed according to their physical sequence in the ring bus. However, this makes the self-management of the ring bus very inflexible and static, in particular if new data bus subscribers are inserted into the ring bus or old ones are replaced.

SUMMARY OF THE INVENTION

It is therefore an object of the present invention to provide a method and a device with which flexible addressing is also possible when exchanging data bus subscribers or initializing the local bus, and with which it is possible straightforwardly to collect information about the corresponding data bus subscribers.

The method according to an exemplary embodiment of the invention for communicating with data bus subscribers connected to a local bus, in particular a ring bus, with a local bus master, comprises sending a first data packet from the local bus master to all data bus subscribers for counting communication-ready data bus subscribers in a sequence, the first data packet having a first counter value that is changed in sequence by each of the communication-ready data bus subscribers. The first counter value may, for example, be a binary value. In other words, a first individual data packet is used to determine the number of data bus subscribers that are currently communication-ready. In this communication phase, no addressing of the data bus subscribers is necessary. The first data packet for counting may, for example, be sent to the local bus in a cycle frame.

For example, a cycle frame in this case may be defined as a recurring (cyclic), preferably equidistant, time interval in which data may be transferred on the local bus. For example, the cycle frame has at least a start identifier (SOC) and a time range for transmitting data. A plurality of start identifiers (SOC) of successive cycle frames are advantageously offset equidistantly in time. The aforementioned time range is intended for transmitting the data packets. The start identifier (SOC) and the data packets are transmitted via the local bus and pass through all data bus subscribers. The start identifier (SOC) is separate, i.e. may be transferred as an independent symbol or may be advantageously contained in a start data packet (SOC packet).

Zero, one or more data packets are transferred within the time range of the cycle frame. Advantageously, idle data is inserted in a cycle frame, in particular adjoining at least one data packet.

Advantageously, the transmission of the data packets and/or idle data causes an uninterrupted signal on the local bus. The signal enables the data bus subscribers to synchronize with it in terms of time. Advantageously, the cycle frame additionally has a trailer. The trailer has a variable length and follows the time range for data transmission, preferably up to the next start identifier (SOC) of the next cycle frame. Advantageously, the trailer has idle data. Each currently communication-ready data bus subscriber may change the first counter value contained in the data packet upon receiving the individual data packet, for example increment or decrement it, before the data packet or the part of the data packet containing the counter value is forwarded to the next data bus subscriber. Data bus subscribers that are not yet communication-ready only pass the data packet along without changing the first counter value. A data bus subscriber may be communication-ready if it is clock-synchronized with the local bus and is able to receive and forward data packets and carry out processing operations on the data packets. If the local bus is a ring bus, the data packet is sent back to the local bus master by the last data bus subscriber, regardless of whether that subscriber is communication-ready or not. Alternatively, the ring bus may also be closed by a bridge unit that sends the data packets received in the downstream direction back in the upstream direction. This happens either again passing through all data bus subscribers so that they may again carry out a processing operation, or bypassing all data bus subscribers via a bypass connection. The local bus master then knows how many data bus subscribers of the local bus are communication-ready based on the first counter value. For information retrieval, the local bus master subsequently generates a plurality of second data packets. The number of second data packets corresponds to the number of communication-ready data bus subscribers indicated by the first counter value. If, for example, the first counter value indicates that there are N communication-ready data bus subscribers, then N second data packets are also generated and sent on the local bus, where N is a natural integer. The plurality of second data packets is then sent from the local bus master to the local bus.

A respective generated second data packet is intended for a respective communication-ready data bus subscriber and is assigned thereto based on the respective relative position of the communication-ready data bus subscriber in the sequence. In other words, the communication-ready data bus subscribers have changed the first counter value of the first data packet in a certain sequence. The plurality of second data packets are preferably sent to the local bus in a sequence corresponding to the sequence in which the first counter value was changed. These second data packets may then be used to address the respective data bus subscribers without their address being known. In other words, the relative position of the communication-ready data bus subscribers in the local bus is determined using the first data packet, and this relative position is then used to address the communication-ready data bus subscribers or to assign and send second data packets to them. Flexible communication and information collection is made possible by using the relative position of the data bus subscribers, which does not depend on the physical position of the data bus subscriber, but instead depends on its communication readiness. Each data packet of the plurality of second data packets is assigned to exactly one data bus subscriber, which uses this second data packet to send information to the local bus master. Accordingly, the local bus master addresses the data bus subscribers in this communication phase one after the other, in the same sequence in which the data bus subscribers changed the first counter value of the first data packet.

The data packets transmitted on the local bus as described herein may also be referred to as data telegrams. The data packets may also be referred to as communication data packets which are used in particular for programming and/or for controlling and/or for monitoring and/or for identifying at least one data bus subscriber.

The data bus subscribers are used to control or monitor a process, in particular by outputting control signals, for example to actuators, and/or by receiving measurement signals, for example from sensors. The data bus subscriber converts the control signals and/or measurement signals into data for the local bus or vice versa.

The individual data packet that is used for the first count can be of the same type as the plurality of second data packets that the local bus master generates and sends to the local bus, which correspond in number to the first counter value.

Each data packet of the plurality of second data packets can have a second counter value for assigning the data packet, and the second counter value is different, i.e. has a different starting value, in each of the second data packets. This second counter value is used for relative addressing of the data bus subscribers.

If a data bus subscriber recognizes that a second counter value of a data packet that is used for the relative addressing corresponds to a specific reference value, this data bus subscriber recognizes that the data packet carrying this second counter value is intended for the data bus subscriber. With relative addressing, each data bus subscriber changes the second counter value of each of the plurality of second data packets. The change may be an increment or decrement of the second counter value. The local bus master may be adapted so as to adapt the second counter value according to the number of counted data bus subscribers, i.e. to the first counter value, in such a way that each second counter value is different. In addition, every second counter value is adapted in such a way that, as a result of the data bus subscribers changing the second counter value, the second counter value reaches a reference value with only one communication-ready data bus subscriber. The reference value may, for example, be the same reference value in all data bus subscribers, so that the second counter value of each data packet accordingly differs. If the second counter value of a data packet reaches the reference value at a communication-ready data bus subscriber, this data bus subscriber knows that the data packet is intended for this data bus subscriber. To this end, each data bus subscriber may be designed to perform a comparison between a reference value and the second counter value in each data packet of the plurality of second data packets. For example, the second counter value may be represented by a binary representation.

For example, the data packet that is the first of the plurality of second data packets to be sent, may have a second counter value that corresponds to the highest binary representation of the possible value range for the second counter value. In other words, the data packet sent as the first of the plurality of second data packets has only ones in the second counter value. In this case, the value range may be a function of the maximum number of data bus subscribers that may be connected to the local bus.

If the first data bus subscriber increments the second counter value of the first data packet sent from among the plurality of second data packets to be sent, this counter value experiences a zero crossing, i.e. the binary representation has only zeros. Alternatively, the reference value may also be a zero crossing of a plurality of signifiers of final bits. If the reference value of the first data bus subscriber is zero, the first data bus subscriber in the example given here recognizes that the data packet is directed to the first data bus subscriber, i.e. assigned to that subscriber. The second data packet of the plurality of second data packets sent to the local bus may be intended for the second data bus subscriber, i.e. it may be directed to that subscriber. In this data packet, the local bus master may set the second counter value to a value that two data bus subscribers may increment before the value registers a zero crossing. The data packet sent as the second of the plurality of second data packets, thus, may be incremented by the first data bus subscriber, and is incremented by this subscriber to the highest binary representation, i.e. to a value that has only ones. But because no zero crossing was recorded, the first data bus subscriber knows that the data packet is not intended for the first data bus subscriber and forwards it on the local bus to the next communication-ready data bus subscriber. This increments once more the second counter value that has already been incremented once. In this case, a zero crossing is experienced, and thus the second communication-ready data bus subscriber knows that this data packet is intended for the second data bus subscriber. In this way, the local bus master may assign all data packets of the plurality of second data packets to the respective communication-ready data bus subscribers, or address or direct them to the respective data bus subscribers, by means of the second counter value and its reaching of a reference value. The skilled person understands that even though incrementing is described here and a zero crossing is assumed as the reference value, this may also be accomplished by decrementing and a ones crossing. In other words, the second counter value of the first data packet sent is set to zero. If this value is decremented, the counter value jumps to ones only.

The data packet sent as the second of the plurality of data packets, in this case, contains a one, etc. as the starting value for the second counter value. In addition, the skilled person understands that other counting mechanisms may also be used and that the second counter value may be set correspondingly, so as to correspond to these counting mechanisms. The counter value may preferably be set up in the counting mechanisms so as to accept a reference value only once, so as to yield a bijective mapping of data packets. For example, a comparison with the reference value may first take place followed by incrementing/decrementing.

When a data bus subscriber detects that a data packet is directed to the data bus subscriber because the second counter value in that data packet has reached a reference value corresponding to a reference value stored in the data bus subscriber, the data bus subscriber may write information stored in the data bus subscriber into a field of the data packet directed to the data bus subscriber. For example, the data bus subscriber may write its address into the field. In this way, the local bus master may collect information about the data bus subscribers.

In an exemplary embodiment of the method, the method comprises comparing the first counter value and second counter value of at least one data packet from the plurality of data packets in the local bus master, after passing through the local bus, i.e. after each communication-ready data bus subscriber has processed the at least one data packet. If no additional data bus subscribers have become communication-ready between the first counting and the return of the data packets on the local bus master, there is a defined relationship between the first counter value and the second counter value.

For example, the second counter value of the first data packet of the plurality of second data packets is equal to the first counter value minus one, and the second counter value of the last data packet of the plurality of second data packets is equal to the reference value, for example, equal to zero.

This is due to adapting the second counter value to the number of data bus subscribers counted using the first counter value.

The second counter value of each data packet of the plurality of second data packets, in this case, is changed exactly once by each data bus subscriber according to the number of data bus subscribers, i.e. the number that the first counter value indicates. If, during the first counting using the first counter value and the transmission of the plurality of second data packets, new data bus subscribers have become communication-ready, the local bus master will be unable to recognize a fixed relationship between the first and second counter value. In this case, the local bus master again sends a single first data packet with a first counter value to the data bus subscribers; thus, in this case the local bus master re-counts the communication-ready data bus subscribers. Subsequently, for example, the new counter value may be compared with the old counter value. If these values match, then it may be determined that there was an error in the transmission, or that a data bus subscriber that had signaled communication readiness by processing the first data packet with the first counter value is however unable to process the plurality of second data packets. If the new first counter value deviates from the old counter value, at least one additional data bus subscriber has become communication-ready. In this case, the local bus master re-sends the number of second data packets, with the number being adapted to the new first counter value, and the second counter values of the plurality of second data packets also being adapted to the new first counter value. This method is repeated until the comparison shows that no additional data bus subscribers have become communication-ready in the meantime.

In order to check the number of data bus subscribers connected to the local bus, the local bus master sends out individual first data packets with a first counter value at certain time intervals.

The local bus master sends a new data packet with a first counter value after receiving the number of second data packets, in order to check whether any additional data bus subscribers have become communication-ready in the meantime. The local bus master thus verifies the data received in the plurality of second data packets.

The aforementioned object is also accomplished by a local bus master of a local bus, in particular a ring bus, with data bus subscribers. The local bus master has a transmitter for sending a first data packet to all data bus subscribers, wherein the first data packet is used for counting the communication-ready data bus subscribers in a sequence. The first data packet may have a first counter value that is changed in sequence by each communication-ready data bus subscriber. After receiving the first data packet, the local bus master may then use the first counter value of the data packet to determine how many data bus subscribers are already communication-ready. The local bus master also has a transmitter for sending a plurality of second data packets, the number of which is based on the first counter value. Each of the second data packets is assigned to the communication-ready data bus subscribers in sequence, based on the respective relative position of the communication-ready data bus subscribers; the assignment is based on the second counter value. In this case, the sender may be, for example, a transmitter circuit or a transceiver circuit. The circuits may be implemented in an application-specific integrated circuit (ASIC) or in a field programmable gate array (FPGA).

The above object is also accomplished by a method for communication with a local bus master of a local bus, in particular a ring bus, having communication-ready data bus subscribers. The method comprises a communication-ready data bus subscriber receiving a first data packet from a local bus master, with the first data packet having a first counter value; the communication-ready data bus subscriber changing the first counter value in the data packet; and the communication-ready data bus subscriber receiving a number of second data packets, each of these second data packets having a second counter value. The method additionally comprises writing information stored in the communication-ready data bus subscriber, for example an address, in a field of one data packet, among the plurality of second data packets, that is assigned to the communication-ready data bus subscriber. The data bus subscriber may recognize that a data packet from the plurality of second data packets is assigned to it when the data bus subscriber changes the second counter value of the data packet, and this counter value then reaches a reference value.

The second counter value of the plurality of second data packets is different in each data packet, so that the reference value is only reached exactly once if all communication-ready data bus subscribers change the second counter value of one data packet out of the plurality of second data packets.

The aforementioned task is also accomplished by a communication-ready data bus subscriber of a local bus, in particular a ring bus, having a local bus master. The communication-ready data bus subscriber comprises a receiver for receiving a first data packet from a local bus master, the first data packet having a first counter value, a counter for changing the first counter value in the first data packet, a receiver for receiving a plurality of second data packets, and a writer for writing information, for example an address, stored in the communication-ready data bus subscriber, into a field of one data packet, out of the plurality of second data packets, that is assigned to the communication-ready data bus subscriber. The above task is also accomplished by a local bus system that is formed of a local bus master and at least one data bus subscriber.

The local bus master has a transmitter for sending a first data packet to all data bus subscribers, wherein the first data packet is used for counting the communication-ready data bus subscribers in a sequence. The first data packet may have a first counter value that is changed in sequence by each communication-ready data bus subscriber. The local bus master may also have a receiver for receiving the first data packet with the first counter value that each communication-ready data bus subscriber has changed. After receiving the first data packet, the local bus master may then use the first counter value of the data packet to determine how many data bus subscribers are already communication-ready. The local bus master also has a transmitter for sending a plurality of second data packets, the number of which is based on the first counter value. Each of the second data packets is assigned to the communication-ready data bus subscribers based on the respective relative position of the communication-ready data bus subscribers in the sequence, the assignment being based on the second counter value.

The assignment may be accomplished by giving every second data packet a different starting value for the second counter value.

The communication-ready data bus subscriber comprises a receiver for receiving the individual first data packet from a local bus master, the first data packet having the first counter value; a counter for changing the first counter value in the first data packet; a receiver for receiving the plurality of second data packets; and a writer for writing information stored in the communication-ready data bus subscriber, for example an address, into a field of a data packet assigned to the communication-ready data bus subscriber, out of the plurality of second data packets.

The local bus master may have a receiver for receiving the second data packets modified by the communication-ready data bus subscribers and may read the data written by the communication-ready data bus subscribers into the second data packets.

The above object is also accomplished by a computer-readable medium containing code that causes a computer to carry out one of the methods described herein. The code may be stored in the local bus master and/or the data bus subscriber. In a preferred embodiment, the code is stored in a firmware memory of the local bus master or in a memory that is accessible to the data bus subscribers.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
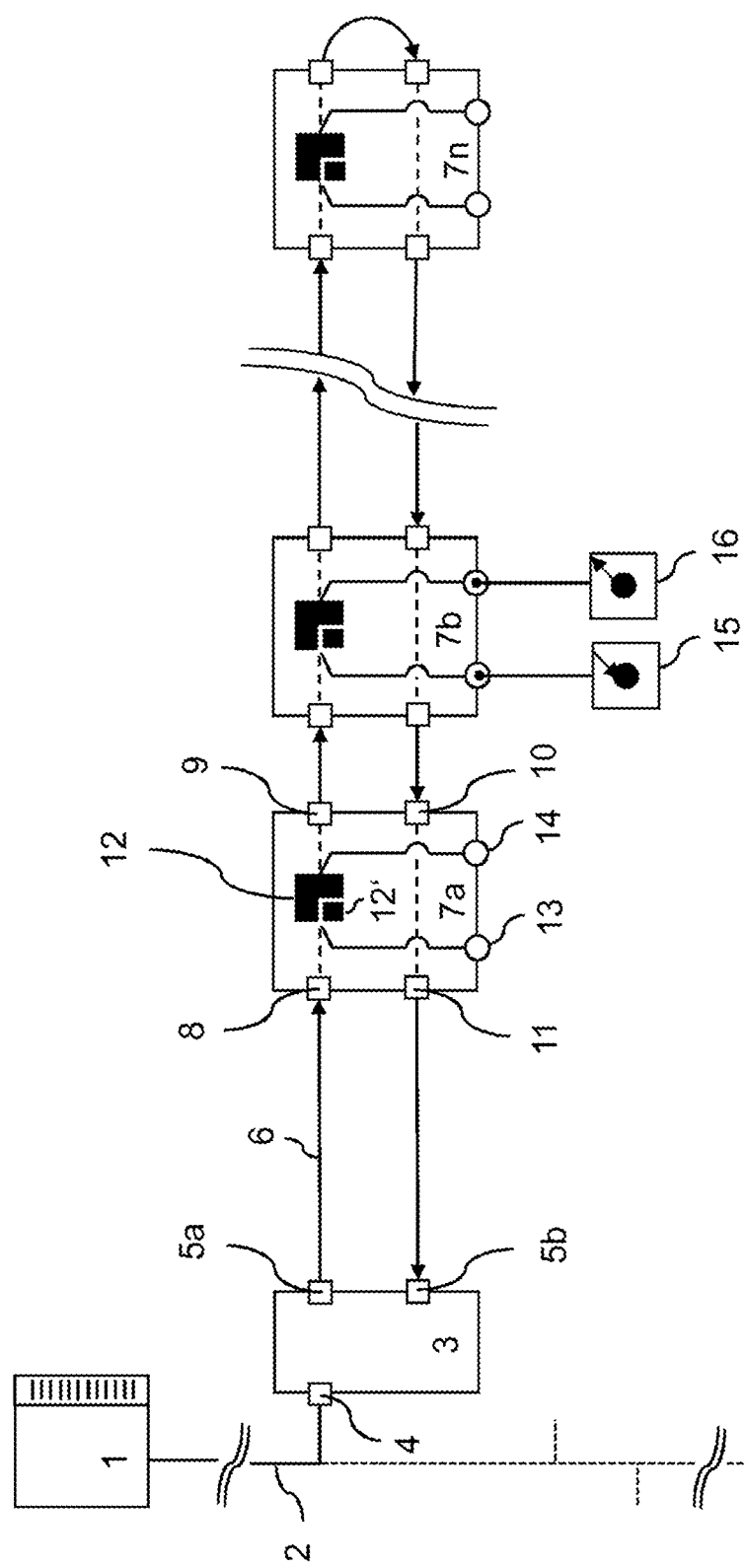
FIG. 1 is a schematic block diagram of an exemplary automation system with a programmable logic controller, a higher-level bus, and a plurality of exemplary data bus subscribers according to the invention.

FIG. 1 shows a schematic block diagram of an automation system. The skilled person understands that the automation system shown is only exemplary, and that all elements, modules, components, subscribers and units belonging to the automation system may be designed differently but may still fulfil the basic functionalities described herein.

The automation system shown in FIG. 1 has a higher-level controller 1, which may be implemented, for example, using a programmable logic controller (PLC). A PLC 1 of this type is basically used to control and regulate the process that the automation system carries out. Currently, however, PLCs 1 used in automation systems also perform more extensive functions, such as for example visualization, alarming and recording all data relating to the process; as such, the PLC 1 functions as a human-machine interface. There are PLCs 1 in different performance classes that have different resources (computing capacity, memory capacity, number and type of inputs and outputs, and interfaces) that enable the PLC 1 to control and regulate the process of the automation system. A PLC 1 usually has a modular structure and formed of individual components, each of which fulfils a respectively different task. A PLC 1 usually is formed of a central computer assembly (with one or more main processors and memory modules) and a plurality of assemblies with inputs and outputs. Such modularly-structured PLCs 1 may readily be extended by adding assemblies. In this case, which assemblies must be integrated into the PLC 1 will depend on the complexity of the process and the complexity of the structure of the automation system. In contemporary automation systems, the PLC 1 is usually no longer an independent system; instead, the PLC 1 is connected to an internet or intranet via corresponding interfaces, which are not shown here. As a result, the PLC 1 is part of a network via or from which the PLC 1 may receive information, instructions, programming and the like. For example, the PLC 1 may receive information about materials supplied to the process via a connection to a computer located in an intranet or internet, so that, for example, the process may be optimally controlled by knowing the number or nature thereof. It is also conceivable that a user may control the PLC 1 by accessing it from an intranet or internet. For example, a user may use a computer, also known as a host computer, to access the PLC 1 and check, change or correct the PLC's user programming. Accordingly, the PLC 1 may be accessed from one or more remote maintenance or control stations. The host computers may have visualization devices for representing process workflows.

To control the process of the automation system, the PLC 1 is connected to automation devices. Bus systems are used for these connections to minimize wiring effort. In the exemplary embodiment shown in FIG. 1, the PLC 1 is connected to a local bus master 3 of a lower-level local bus system via a higher-level bus 2, which in the exemplary embodiment shown here may be a fieldbus. However, not only a local bus master 3 of a local bus as in the exemplary embodiment shown here, but also any other subscribers—not shown here—that are designed to communicate with the PLC 1, may be connected to the higher-level bus 2.

In the exemplary embodiment shown here, the higher-level bus 2 is connected to the local bus master 3. To this end, the local bus master 3 has a first interface 4 that is designed in such a way that it may be connected to the higher-level bus 2. For this purpose, the interface 4 may, for example, have a receptacle in the form of a socket, and the higher-level bus 2 may have a plug that the socket may accommodate. For example, the plug and socket may be a modular plug and modular socket, with each core of the higher-level bus 2 being electrically or optically connected to a connection in the modular socket. However, the skilled person is also familiar with other options for designing an interface 4 so that the local bus master 3 may be electrically or optically connected to the higher-level bus 2. The skilled person is familiar with screw, bearing, click or plug connections that may be used to establish an electrical or optical connection. A male plug is usually accommodated by a female counterpart. This accommodation usually not only establishes the electrical or optical connection, but also ensures that the two parts are mechanically coupled and may only be separated from each other by applying a certain force. However, it is also possible that the higher-level bus 2 may be permanently wired to the interface 4.

The local bus master 3 in the exemplary embodiment shown here has an additional second interface to connect the local bus master 3 to the local bus.

Data bus subscribers 7a, 7b, . . . , 7n are connected to or form the local bus. The local bus is advantageously designed in such a way that a data packet sent by the local bus master 3 is transmitted back to the local bus master 3 by all the data bus subscribers 7a, 7b, . . . , 7n connected to the local bus. In this case, a data bus subscriber 7a, 7b, . . . , 7n always receives only a part of the data packet the data bus subscriber 7a, 7b, . . . , 7n upstream of it. After a time period in which the data bus subscriber 7a, 7b, . . . , 7n may process the data contained in this part, it forwards the part to the downstream data bus subscriber 7a, 7b, . . . , 7n, and at the same time receives a new part of the data packet from the upstream data bus subscriber 7a, 7b, . . . , 7n. In this way, all parts of the data packet pass sequentially through all the data bus subscribers 7a, 7b, . . . , 7n. The local bus is advantageously designed with a ring-shaped structure. Such local buses may also be referred to as ring buses 6. The local bus may alternatively be designed to be stranded or star-shaped, or to have a combination or mixture of the above designs. In this case, the data packets are sent and received via the second interface of the local bus master 3. In the exemplary embodiment shown here, the second interface is divided into a first part 5a and a second part 5b. The first part 5a of the second interface establishes the downstream connection in the ring bus 6 and the second part 5b of the second interface establishes the upstream connection in the ring bus 6.

In the exemplary embodiment shown here, the ring bus 6, the data transmission direction of which is shown with arrows in the exemplary embodiment of FIG. 1, has data bus subscribers 7a, 7b, . . . , 7n. In the exemplary embodiment shown here, these data bus subscribers 7a, 7b, . . . , 7n each have a respective interface 8 in order to receive data from an upstream or preceding data bus subscriber 7a, 7b, . . . , 7n. Data bus subscriber 7a receives data from the upstream local bus master 3 via the interface 8. In addition, in the exemplary embodiment shown here, the data bus subscribers 7a, 7b, . . . , 7n each respectively have an interface 9 in order to forward data to a downstream or subsequent data bus subscriber 7a, 7b, . . . , 7n. Data bus subscriber 7a sends data to the downstream data bus subscriber 7b via the interface 9. The interfaces 8 and 9 are used to propagate data in the downstream direction of the ring bus 6, i.e. away from the local bus master 3. Additionally, in this exemplary embodiment the data bus subscribers 7a, 7b, . . . , 7n also have interfaces 10 and 11 for propagating data in the upstream direction of the ring bus 6, i.e. toward the local bus master 3.

In the case of the data bus subscriber 7a, the interface 10 is designed to receive data from the downstream or subsequent data bus subscriber 7b, and the interface 11 is designed to forward data to the upstream or preceding data bus subscriber, in this case the local bus master 3. Thus, it may also be said that the interfaces 9 and 11 are transmitter interfaces, while the interfaces 8 and 10 are receiver interfaces.

In the exemplary embodiment shown here, the connections of the interfaces and the PLC 1 or the data bus subscribers 7a, 7b, . . . , 7n are implemented with the aid of cables or printed circuit boards and/or by direct or indirect contacting using electrical contacts. Another alternative is that the individual connections are established wirelessly and the interfaces provide the necessary conversions for the radio standards used.

Although in the exemplary embodiment shown here, the local bus master 3 and the individual data bus subscribers 7a, 7b, . . . , 7n are shown spaced apart from each other, i.e. the local bus master 3 is arranged decentrally from the data bus subscribers 7a, 7b, . . . , 7n, the skilled person understands that the data bus subscribers 7a, 7b, . . . , 7n and the local bus master 3—which also represents a data bus subscriber of the ring bus 6—may also be directly connected together. In this case, for example, contacts of one data bus subscriber may access corresponding receptacles or receiving contacts of a directly adjacent data bus subscriber in order to establish an electrical connection between the data bus subscribers so that data may be sent in the downstream and upstream directions. For example, the data bus subscribers 7a, 7b, . . . , 7n may have receptacles on the side facing away from the master and contacts on the side facing toward the master. If the data bus subscribers 7a, 7b, . . . , 7n are then connected in sequence accordingly, the contacts of the one data bus subscriber 7a, 7b, . . . , 7n each engage in the respective receptacles of the other data bus subscriber 7a, 7b, . . . , 7n and an electrical connection may be established. The local bus master 3 in this case correspondingly has contacts on the side that engage with the receptacles of the first data bus subscriber 7a in order to establish an electrical connection between the interfaces 5a and 8 or the interfaces 5b and 11.

However, the skilled person is also familiar with other possibilities, for example pressure contacts, knife and fork contacts, for establishing an electrical or optical connection between two data bus subscribers 7a, 7b, . . . , 7n arranged directly next to each other using appropriate components.

If it is desired that data bus subscribers 7a, 7b, . . . , 7n and the local bus master 3 are directly connected together, they may also have mechanical mountings or mechanical fasteners using which the individual data bus subscribers 7a, 7b, . . . , 7n and the local bus master 3 may be connected to each other. For example, a data bus subscriber 7a, 7b, . . . , 7n may have a projection on one side and an undercut on the other. If the data bus subscribers 7a, 7b, . . . , 7n are then connected in sequence, a projection engages in an undercut of the other data bus subscriber 7a, 7b, . . . , 7n, so that a mechanical coupling occurs. For straightforwardly sequentially arranging the data bus subscribers 7a, 7b, . . . , 7n, they may also be arranged on a shared mounting, for example a top-hat rail. The data bus subscribers 7a, 7b, . . . , 7n may have appropriate fasteners for fastening onto the top-hat rail. Alternatively or additionally, the data bus subscribers 7a, 7b, . . . , 7n may also, for example, have detachably connectable fasteners with which the data bus subscribers 7a, 7b, . . . , 7n may be fastened either to the top-hat rail or to another mounting. For this purpose, the detachably connectable fasteners may be replaceable and a corresponding fastener for the desired mounting may be connected to the data bus subscribers 7a, 7b, . . . , 7n so that these may be fastened to the desired mounting.

In addition, the data bus subscribers 7a, 7b, . . . , 7n in the exemplary embodiment shown in FIG. 1 also have a processing unit 12, which for example includes a processing component and a logic unit. The processing unit 12 may also be described as the complete circuit of the data bus subscriber. In other words, the processing unit 12 receives data via the inputs 8 and 10 and transmits data via the outputs 9 and 11. In addition, the processing unit 12 may receive or output data via the input/outputs 13 and 14.

Moreover, the processing unit 12 has access to a memory 12' of the data bus subscriber 7a, 7b, . . . , 7n in which, for example, data, process data or instruction lists are stored.

The processing unit 12 may be designed to process received data and to output data. Data for processing may be received either from an upstream data bus subscriber or from inputs 13 of the data bus subscriber 7a, 7b, . . . , 7n. The inputs 13 of the data bus subscriber 7a, 7b, . . . , 7n may in this case be connected to sensors 15 that for example send measurement data, status data, and the like. Processed data may be output either to a downstream data bus subscriber or to outputs 14 of the data bus subscriber 7a, 7b, . . . , 7n. The outputs 14 of the data bus subscriber 7a, 7b, . . . , 7n may be connected to actuators 16, that for example carry out a certain action using the data directed to them. If data processing also takes place in the upstream direction, data may also be received from a downstream data bus subscriber 7a, 7b, . . . , 7n and processed data may be sent to an upstream data bus subscriber 7a, 7b, . . . , 7n.

For the sake of simplicity, the data bus subscribers 7a, 7b, . . . , 7n are only shown with one input 13 and one output 14 in the exemplary embodiment shown here, and only data bus subscriber 7b is connected to a sensor 15 and actuator 16. However, the skilled person understands that the data bus subscribers 7a, 7b, . . . , 7n may have a multiplicity of inputs and outputs 13 and 14, and may be connected to a multiplicity of different sensors 15 and actuators 16. The characteristic feature of the sensors 15 is that the sensors 15 receive data or signals and send them to the data bus subscribers 7a, 7b, . . . , 7n, while the actuators 16 receive data or signals from the data bus subscribers 7a, 7b, . . . , 7n and perform an action based on these data or signals.

Alternatively, the interfaces 8, 9, 10 and 11 may be integrated in a module unit and the data bus subscribers 7a, 7b, . . . , 7n may be plugged into this module unit. The module units may also be described as basic elements of the ring bus 6. The ring bus infrastructure is set up by the module units and the data bus subscribers 7a, 7b, . . . , 7n are replaceable, so that the ring bus 6 may be set up with any arbitrary data bus subscribers 7a, 7b, . . . , 7n.

The module units also serve to ensure that communication between the remaining data bus subscribers 7a, 7b, . . . , 7n is not interrupted even if a data bus subscriber 7a, 7b, . . . , 7n is removed, because communication takes place via the remaining module units.

The data bus subscribers 7a, 7b, . . . , 7n shown in this exemplary embodiment are often referred to as I/O modules, due to their inputs and outputs 13, 14, which may be connected to sensors 15 or actuators 16. Although the data bus subscribers 7a, 7b, . . . , 7n are shown as spatially separated from the sensors 15 or actuators 16 in the exemplary embodiment shown here, the sensors 15 or actuators 16 may also be integrated into the I/O module.

The ring bus 6 shown in this exemplary embodiment is based on cycle frame communication.

Each data packet is sent in a downstream direction from the local bus master 3 to the first data bus subscriber 7a of the ring bus 6. This subscriber receives a first part of the data packet via the interface 8. Such a part of the data packet is also referred to below as a "piece" or "unit." The data bus subscriber 7a then carries out a processing operation on the part, and then forwards the part to the next data bus subscriber 7b via the interface 9; preferably at the same time, the first data bus subscriber 7a receives a second part of the data packet, and so forth. The size of the parts of the data packet, i.e. the chunking of the data packet, depends on the receiving capacity of the data bus subscribers 7a, 7b, . . . , 7n; for example, a fixed number of bits, for example 8 bits of the data packet, may be simultaneously available for processing at the data bus subscriber 7a, 7b, . . . , 7n.

Accordingly, the data packet passes through the data bus subscribers 7a, 7b, . . . , 7n in units, chunks or parts, for example in parts or symbols of 8 bits. The part of the data packet that the last data bus subscriber has processed (in the exemplary embodiment shown here, data bus subscriber 7n), then passes through the ring bus 6 in the upstream direction, so that the parts starting from the last data bus subscriber n are again sent upwards in the direction of local bus master 3 by all data bus subscribers 7a, 7b, . . . , 7n.

For this purpose, the last data bus subscriber 7n either has a switchable bridge that connects interface 9 with interface 10 or a switchable bridge—not shown here—is connected to the last data bus subscriber 7n, which assumes the function of forwarding the parts of the data packet from the interface 9 to the interface 10. Alternatively, the interface 10 of the data bus subscriber 7n may also be connected directly to the interface 5b of the local bus master 3 using a bypass line—not shown here.

In the upstream direction, the units of the data packet or data packets may be looped back to the local bus master 3 by the individual data bus subscribers 7a, 7b, . . . , 7n, as in the exemplary embodiment shown here, without further processing. However, it is also conceivable that in the upstream direction the units of the data packet are processed again, so that the data packet may be processed twice, once in the downstream direction to the last data bus subscriber 7n and once in the upstream direction to the local bus master 3. For example, processing may take place in the upstream direction by signal refreshing and/or phase shifting.

However, before the data packets carrying process data may be sent on the local bus 6, the local bus 6 must be initialized. Thus, the local bus master 3 must learn which data bus subscribers 7a, 7b, . . . , 7n are present and may query this information. If the local bus 6 is designed so that the data bus subscribers 7a, 7b, . . . , 7n may also be changed during operation, which is referred to as a "hot swap," the local bus master 3 must also be able to recognize the new data bus subscribers during operation and query this information.

According to the invention, the local bus master 3 uses a first data packet and a plurality of second data packets for this initial initialization or for the intermediate initialization. The first data packet is sent unaddressed to the local bus 6 and passes through all data bus subscribers 7a, 7b, . . . , 7n.

The plurality of second data packets is then sent on the local bus 6 and likewise passes through all data bus subscribers 7a, 7b, . . . , 7n. The first data packet and the plurality of second data packets may be of the same type. A corresponding data packet is shown by way of example in FIG. 2.

Figure 2:
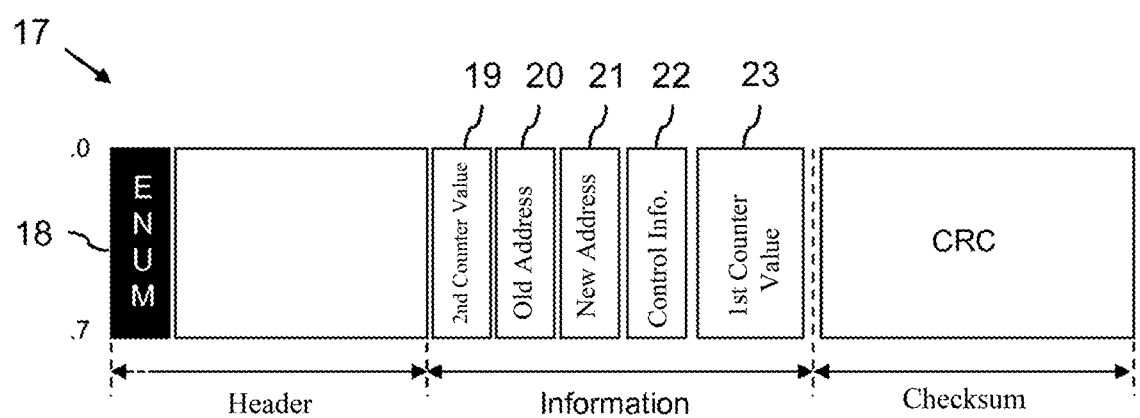
FIG. 2 is an exemplary data packet with a first and a second counter value.

The data packet 17 shown by way of example in FIG. 2 formed of a general header part or "header," an information part or "payload," and a checksum part or "checksum."

The header contains a field 18 that contains a unique bit pattern ENUM that occurs only once, which may also be referred to as a codeword or identifier. The number and configuration of unique bit patterns or code words depend on the coding used on the local bus 6. Alternatively or additionally, special bit patterns or code words may be defined in the bus protocol used. It is only of importance that the data bus subscribers 7a, 7b, . . . , 7n may bijectively identify, from the bit pattern or codeword of the field 18, which type of data packet 17 is involved. In the exemplary embodiment shown here, the data bus subscribers 7a, 7b, . . . , 7n are aware that if a field 18 with an ENUM bit pattern is received, it is a data packet 17 for initialization or intermediate initialization.

The header may also contain additional information that may be used to control or verify the data packet 17 and the data it contains. The skilled person knows many fields that the header may contain.

The information part of the data packet 17 has a plurality of fields that may be used for initialization and intermediate initialization. The data packet 17 in this case has a first counter value 23 and a second counter value 19. The first counter value 23 is used for counting the data bus subscribers 7a, 7b, ..., 7n on the local bus 6. In this case, the first counter value 23 of each data bus subscriber 7a, 7b, ..., 7n that is communication-ready, i.e. of each data bus subscriber 7a, 7b, ..., 7n that for example is able to process the data packet 17, is changed.

This change may include incrementing or decrementing the first counter value 23. When the data packet 17 has passed through the local bus 6, i.e. has arrived back at the local bus master 3, the local bus master knows how many communication-ready data bus subscribers 7a, 7b, ..., 7n are connected to the local bus 6. In addition, the data packet 17 also has a second counter value 19, which is used to assign the data packet 17 to the communication-ready data bus subscribers 7a, b, ..., 7n, as explained in greater detail below with regard to FIGS. 3 to 7.

In addition, the data packet has a field 20 that the data bus subscribers 7a, 7b, ..., 7n may use to communicate their stored address to the local bus master 3. The data packet 17 also has a field 21 with which the local bus master 3 may assign a new address to the data bus subscribers 7a, 7b, ..., 7n. In addition, the data packet 17 may also have an additional field 22 that may carry control information for the respective data bus subscribers 7a, 7b, ..., 7n. The skilled person understands that although a specific sequence and number of fields 19 to 23 is specified here, it is possible to deviate from this arrangement and number of fields without departing from the subject matter of the invention. Moreover, the skilled person understands that although only the querying of address information is shown here by way of example, other information may also be queried from the data bus subscribers 7a, 7b, ..., 7n; and that corresponding fields may be included in the data packet 17 for this purpose.

In the exemplary embodiment shown here, the data packet 17 is divided into symbols of respectively 8 bits each. The data bus subscribers 7a, 7b, ..., 7n also receive and process the data packet 17 chunked in this fashion. In other words, first the local bus master 3 sends the symbol or field ENUM 18 to the first data bus subscriber 7a, and after a predetermined time, the local bus master 3 sends another symbol of the header of the data packet 17 to the data bus subscriber 7a, which in turn at the same time sends the symbol or field ENUM 18 to the data bus subscriber 7b. In this way, all parts of data packet 17 pass through the respective data bus subscribers 7a, 7b, ..., 7n, and at any given time each data bus subscriber 7a, 7b, ..., 7n always only holds one piece or part of data packet 17 that it may process.

Figure 3:
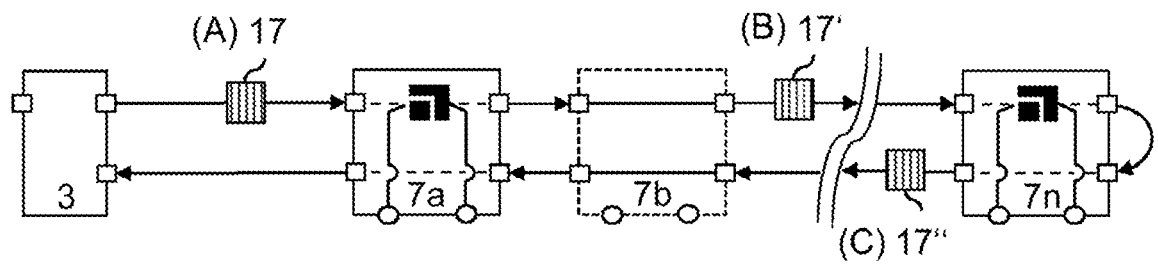
FIG. 3 shows the sending of a single data packet through the data bus subscribers shown in FIG. 1 to count the data bus subscribers.
Figure 3:
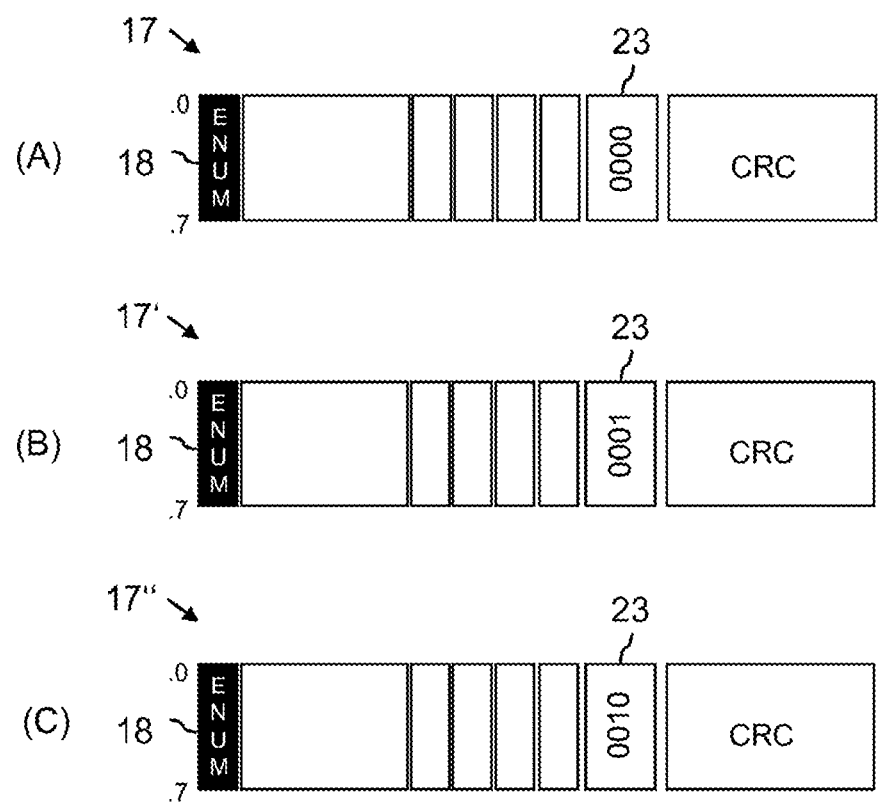

FIG. 3 shows an exemplary initialization of the local bus 6. In the exemplary embodiment shown here, only data bus subscribers 7a and 7n are communication-ready. Data bus subscriber 7b is present on local bus 6 but is not yet communication-ready, as shown by the fact that data bus subscriber 7b only transmits the downward and upward data streams. At a given time, the local bus master 3 sends a first data packet 17 in symbol form to the communication-ready data bus subscriber 7a. This is indicated by the first data packet 17 at position (A) of the local bus 6. Thus, the data bus subscriber 7a first receives the field 18 of the first data packet 17 with the bijectively-mapped bit pattern and knows that initialization is now taking place. If the field 23 is then received at the data bus subscriber 7a, it may be used for processing, i.e. to change the value of this field 23. In the exemplary embodiment shown here, the field 23 has a binary value and the data bus subscriber 7a increments the binary value. In the exemplary embodiment shown here, the local bus master 3 set the first counter value 23 to 0000, and the data bus subscriber 7a incremented this value by one to 0001. Thus, after the data packet passes through the data bus subscriber 7a, it differs from the data packet 17 that the local bus master 3 sent. In the exemplary embodiment shown here, this is shown by marking the data packet as data packet 17'. This same data bus subscriber 7a also sends the data packet 17' in symbol form to the next data bus subscriber 7b. Because the data bus subscriber 7b is not yet communication-ready, it forwards the symbols of the data packet 17' directly to the next data bus subscriber, namely data bus subscriber 7n in the exemplary embodiment shown here. This is indicated by the data packet 17' at position (B) of the local bus 6. The data packet 17' was therefore not processed by the data bus subscriber 7b, which is not yet communication-ready; thus, the value of the first counter value corresponds to the value to which data bus subscriber 7a incremented it, namely 0001. The data bus subscriber 7n then receives the data packet 17' and first recognizes the bijectively-mapped bit pattern 18. If the symbol with the first counter value 23 is received by the data bus subscriber 7n, the first counter value 23 is incremented to 0010, because the data bus subscriber 7n is already communication-ready.

The data bus subscriber 7n forwards the changed data packet 17" back to the local bus master 3. This is indicated by the data packet 17" at position (C) of the local bus 6. The local bus master 3 may then read out the first counter value 23 from the data packet 17" and as a result may determine how many communication-ready data bus subscribers 7a, 7n are present on the local bus 6. This is because only the communication-ready data bus subscribers 7a, 7n change the counter value 23, while the non-communication-ready data bus subscribers 7b do not change it.

Figure 4:
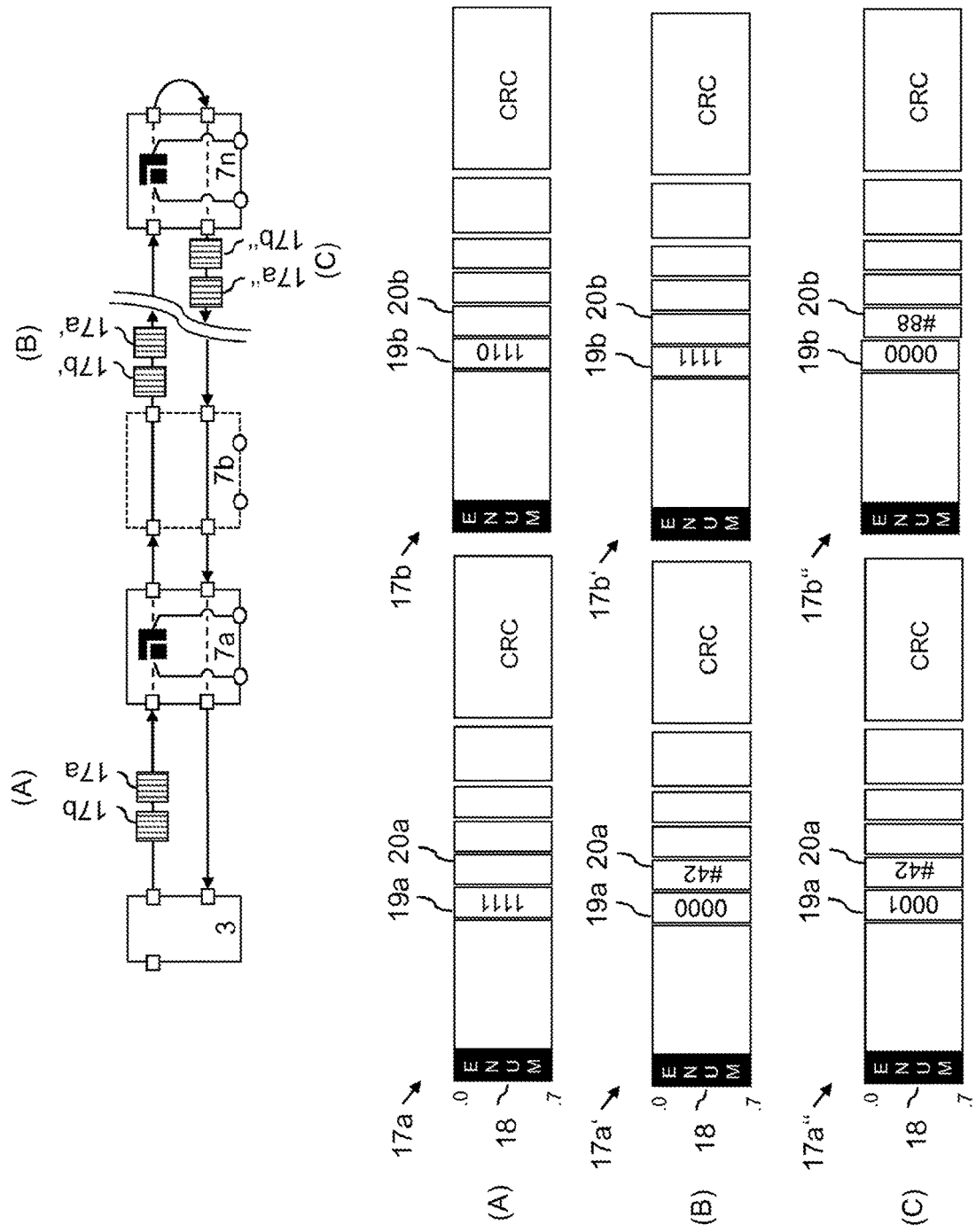
FIG. 4 shows the sending of a plurality of data packets by the data bus subscribers shown in FIG. 1 to retrieve information from the data bus subscribers.

The local bus master 3 then generates data packets 17, the number of which is the number of communication-ready data bus subscribers 7a, 7n that the first counter value 23 indicates; this is shown in FIG. 4. In the exemplary embodiment shown here, the local bus master 3 generates two second data packets 17a and 17b, corresponding to the first counter value 23. Each data packet 17a, 17b has a second counter value 19a, 19b. The two data packets 17a, 17b are assigned to the communication-ready data bus subscribers 7a and 7n using this second counter value 19a, 19b. For this purpose, the local bus master 3 sets the second counter value 19a of the data packet 17a to the highest binary representation that the second counter value 19a may assume, namely 1111 in the exemplary embodiment shown here. The second counter value 19b of the second data packet 17b is set to a value decremented by one relative to the data packet 17a; in this case, to 1110. Subsequently, the local bus master 3 sends the data packets 17a, 17b to the first data bus subscriber 7a. This is indicated by the data packets 17a and 17b at position (A) of the local bus 6. The first data bus subscriber 7a receives the two data packets 17a and 17b in symbol form. The data bus subscriber 7a increments the respective second counter value 19a and 19b of the two data packets 17a and 17b. If the data bus subscriber 7a recognizes a zero crossing when incrementing one of the second counter values 19a, 19b, i.e. if the second counter value 19a, 19b of a data packet jumps to zero when incrementing, the data bus subscriber 7a recognizes that the corresponding data packet 17a, 17b in which the second counter value 19a, 19b jumps to zero is directed to the data bus subscriber 7a.

In the exemplary embodiment shown here, the first data packet 17a sent is directed to the data bus subscriber 7a.

At this data bus subscriber 7a, the second counter value 19a undergoes a zero crossing if the data bus subscriber 7a increases the second counter value 19a. In this case, the data bus subscriber 7a knows that the subsequent symbols that pass through the data bus subscriber 7a are intended for this data bus subscriber 7a. For this reason, in this exemplary embodiment, the second counter value 19a is prepended to the other fields in the information part of the data packet 17a, so that when a zero crossing of the second counter value 19a is recognized, the data bus subscriber 7a may process the subsequent symbols. In the exemplary embodiment shown here, the data bus subscriber 7a is designed to write its address into a field 20a of the data packet 17a directed to the data bus subscriber 7a. In the exemplary embodiment shown here, the address of the data bus subscriber 7a is #42. The skilled person understands that the data bus subscriber 7a may also be designed to write other information into the data packet 17a and the address information is used here only by way of example. The data bus subscriber 7a recognizes the end of the data packet 17a upon receiving the symbol with the bijectively-identified bit pattern 18b of the data packet 17b sent second. The data bus subscriber 7a also increases the second counter value 19b of this data packet 17b. Because the local bus master 3 adapted the second counter value 19b in such a way that the second counter value 19b of the data packet 17b was lowered by one compared to the second counter value 19a of data packet 17a, no zero crossing is recognized yet, but the second counter value 19b of data packet 17b is only shifted from 1110 to 1111. The data bus subscriber 7a sends the data packets 17a' and 17b' in symbol form to the next data bus subscriber 7b. But because the next subscriber is still not communication-ready, the data packets 17a', 17b' are forwarded unchanged to the next data bus subscriber 7n. This is indicated by the data packets 17a' and 17b' at position (B) of the local bus 6. The data bus subscriber 7n likewise receives the data packets 17a' and 17b' in symbol form, and this data bus subscriber 7n is also adapted to increase the second counter value 19a, 19b. This causes the second counter value 19a of data packet 17a' to be shifted from 0000 to 0001 and the second counter value 19b of data packet 17b' to undergo a zero crossing. In this case, the data bus subscriber 7n recognizes that the data packet 17b' is directed to the data bus subscriber 7n, and knows that the subsequent symbols are directed to the data bus subscriber 7n.

Like the data bus subscriber 7a, the data bus subscriber 7n inserts its address into the field 20b of the data packet 17b', the address of the data bus subscriber 7n being #88. Here, too, the skilled person understands that information other than the address information may also be written into the data packet 17b'. The data bus subscriber 7n forwards the symbols of the data packets 17a" and 17n" to the local bus master 3. This is indicated by the data packets 17a" and 17b" at position (C) of the local bus 6. The local bus master 3 receives the data packets 17a" and 17b" with the fields 20a" and 20b", and thus acquires knowledge that the data bus subscriber 7a has address #42 and the data bus subscriber 7n has address #88. If the data bus subscribers 7a, 7n are adapted to write other information into the data packets 17a, 17b, the local bus master 3 correspondingly acquires knowledge of this information. If the second counter value 19b of the last data packet 17b" is zero, the local bus master 3 may verify that the initialization was successful, provided that no further processing of the data packets takes place in the upstream direction.

Figure 5A:
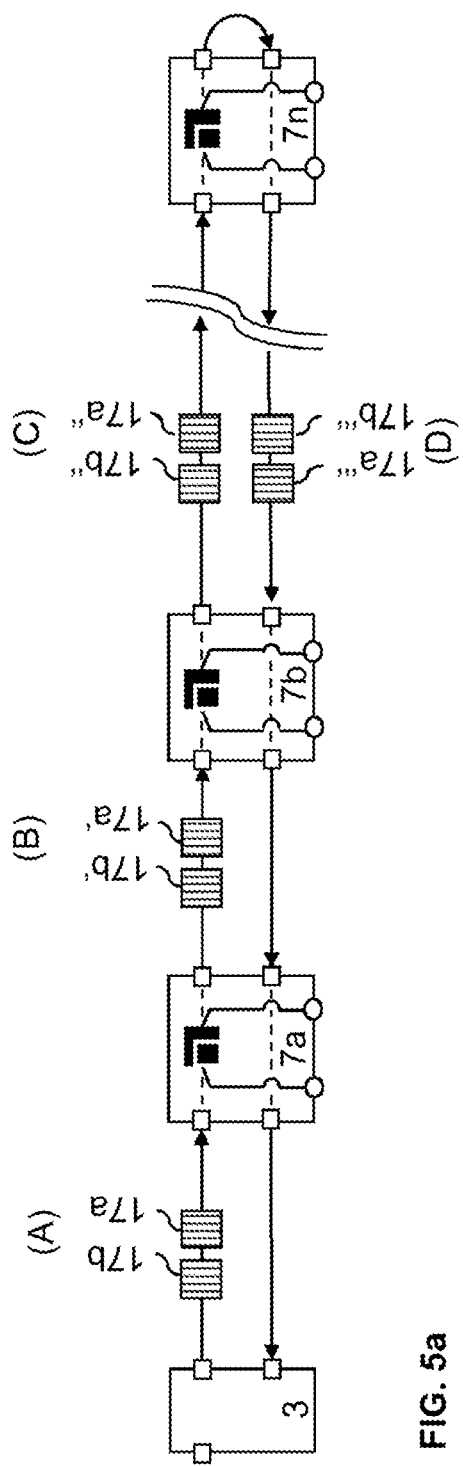
FIGS. 5a and 5b show the transmission of a plurality of data packets by the data bus subscribers shown in FIG. 1 with an additional communication-ready data bus subscriber.
Figure 5B:
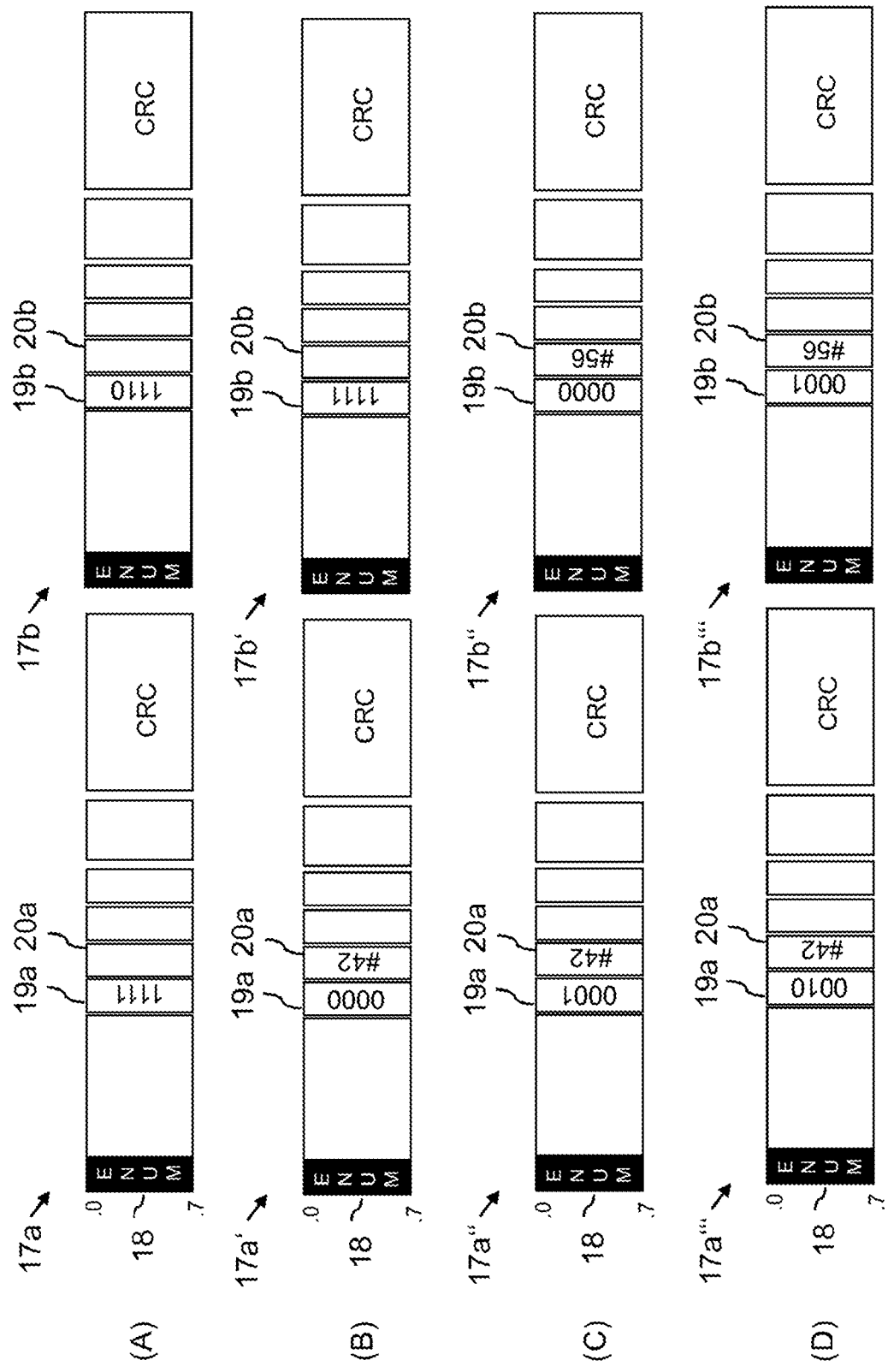

FIGS. 5a and 5b show the same situation as FIG. 4, namely the passage of two data packets 17a and 17b through the local bus 6, wherein each communication-ready data bus subscriber 7a, 7b, . . . , 7n writes its address into the following field 20a, 20b of the respective data packet 17a, 17b upon detecting a zero crossing in the second counter value 19a, 19b. However, in the case shown in FIGS. 5a and 5b, in contrast to the situation in FIG. 4, the data bus subscriber 7b has become communication-ready in the meantime, for example after the first data packet 17 has been passed through to count the number of communication-ready data packets and before the second data packets 17a, 17b have passed through. As a result, the data bus subscriber 7b does not merely forward the data packets 17a' and 17b', but processes them. From the local bus master 3 to the data bus subscriber 7a, the situation corresponds to FIG. 4. This is indicated by the data packets 17a and 17b at position (A) of the local bus 6. The data bus subscriber 7a receives the data packets 17a, 17b, increases the values of the respective second counter values 19a, 19b and recognizes in the data packet 17a a zero crossing in the second counter value 19a of this data packet 17a and writes its address #42 in the field 20a of the data packet 17a. The data bus subscriber 7a also increases the second counter value 19b of data packet 17b by one from 1110 to 1111, and forwards the data packets 17a', 17b' to the next data bus subscriber 7b.

This is indicated by the data packets 17a' and 17b' at position (B) of the local bus 6. The data bus subscriber 7b is now communication-ready and performs the same processing as the data bus subscribers 7a and 7n. The data bus subscriber 7b increases the second counter values 19a, 19b of the respective data packets 17a', 17b' accordingly, and detects a zero crossing in the second counter value 19b of the data packet 17b'. Thus, the data bus subscriber 7b writes its address #56 into field 20b of the data packet 17b'. The data packets 17a' and 17b' are routed from the data bus subscriber 7b to the next data bus subscriber 7n. This is indicated by the data packets 17a" and 17b" at position (C) of the local bus 6. However, the data bus subscriber 7n does not recognize a zero crossing in any of the data packets 17a", 17b", because the second data bus subscriber 7b has already used the data packet 17b" directed to this data bus subscriber 7n to communicate its address. The data bus subscriber 7n accordingly increases the second counter values 19a, 19b of the respective data packets 17a", 17b" but does not communicate its address. The data bus subscriber 7n however forwards the data packets 17a'", 17b'" to the local bus master 3. This is indicated by the data packets 17a'" and 17b'" at position (D) of the local bus 6. The local bus master 3 recognizes that the second counter value 19b of the last data packet 17b'" deviates from zero. As a result, the local bus master 3 recognizes that the number of sent data packets 17a, 17b does not match the number of communication-ready data bus subscribers 7a, 7b, . . . , 7n. Based on the deviation between the second counter value 19b of the last data packet 17b" and the value of the first counter value 23 used for counting the communication-ready data bus subscribers 7a, 7b, 7n, the local bus master 3 recognizes how many communication-ready data bus subscribers 7a, 7b, . . . , 7n have been added. The local bus master 3 may use this information to re-send a corresponding number of data packets. However, the local bus master 3 may also wait a certain time after recognizing that one or more new data bus subscribers 7b have become communication-ready, before re-sending a single first data packet 17 to count the communication-ready data bus subscribers 7a, 7b, . . . , 7n that are now present on the local bus 6; this is shown in FIG. 6.

Figure 6:
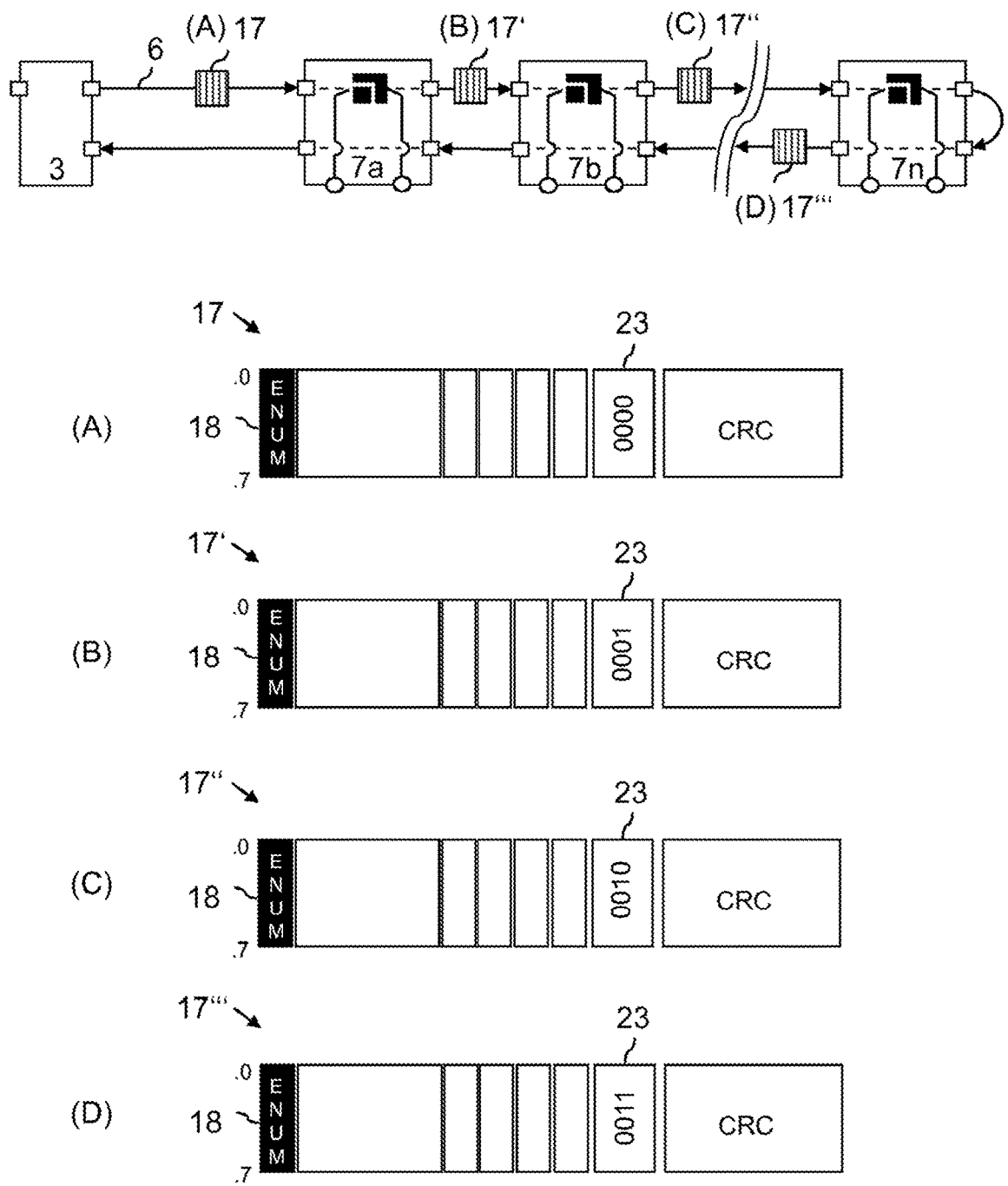
FIG. 6 shows the re-sending of a single data packet by the data bus subscribers shown in FIG. 1 for counting the data bus subscribers.

FIG. 6 shows the re-counting of the communication-ready data bus subscribers 7a, 7b, . . . , 7n that are present on the local bus 6. At a given time, the local bus master 3 sends a single first data packet 17 in symbol form to the communication-ready data bus subscriber 7a. This is indicated by the data packet 17 at position (A) of the local bus 6. Thus, the data bus subscriber 7a first receives the field 18 of the data packet with the bijectively-mapped bit pattern and is aware that an initialization is now taking place. If the field 23 is then received at the data bus subscriber 7a, it may be used for processing, i.e. to change the value of this field 23. In the exemplary embodiment shown here, the field 23 has a binary value and the data bus subscriber 7a increments the binary value. In the exemplary embodiment shown here, the local bus master 3 set the first counter value 23 to 0000, and the data bus subscriber 7a incremented this value by one to 0001. In other words, after passing through the data bus subscriber 7a, the data packet differs from the data packet 17 as sent by the local bus master 3, as is shown in the exemplary embodiment shown here by identifying the data packet as data packet 17'. This same data bus subscriber 7a also sends the data packet 17' in symbol form to the next data bus subscriber 7b. The data bus subscriber 7b receives the data packet 17' and increments the value of the first counter value 23. Thus, after passing through the data bus subscriber 7b, the data packet differs from the data packet 17 sent by the local bus master 7a. In the exemplary embodiment shown, this is shown by indicating the data packet as data packet 17". The data bus subscriber 7b itself also sends the data packet 17" in symbol form to the next data bus subscriber 7n. The data bus subscriber 7n receives the data packet 17" and increments the value of the first counter value 23. Thus, after passing through the data bus subscriber 7n, the data packet differs from the data packet 17 sent by the local bus master 7b. In the exemplary embodiment shown, this is indicated below by identifying the data packet as data packet 17'''. The data bus subscriber 7n itself also sends the data packet 17''' in symbol form to the local bus master 3. The local bus master 3 then knows how many communication-ready data bus subscribers 7a, 7b, . . . , 7n the local bus 6 has.

Figure 7A:
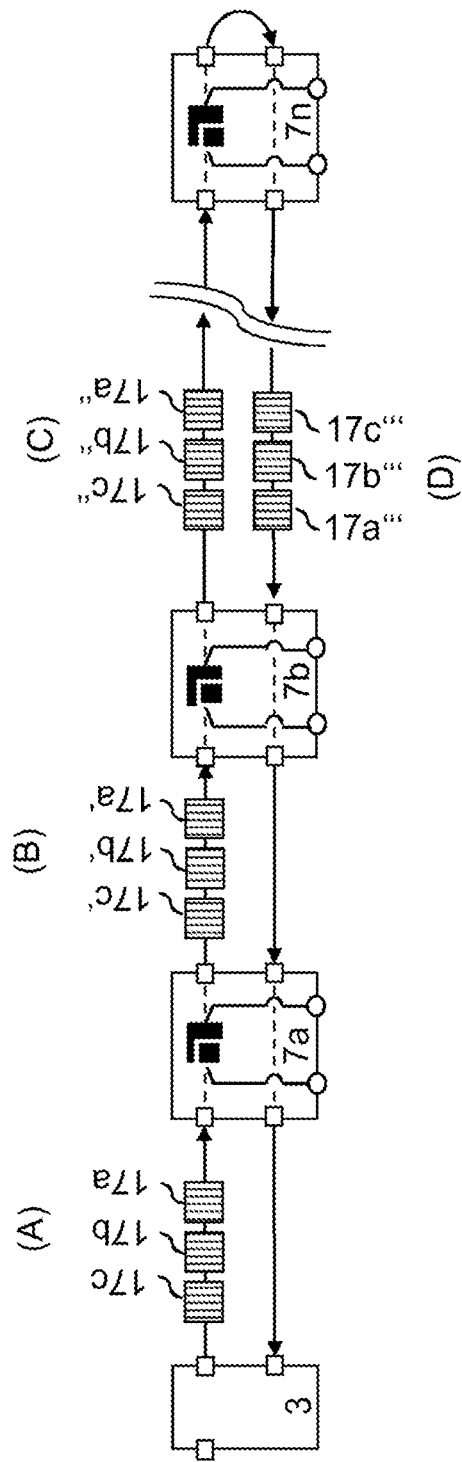
FIGS. 7a and 7b show the re-sending of a plurality of data packets by the data bus subscribers shown in FIG. 1 to query information from the data bus subscribers.
Figure 7B:
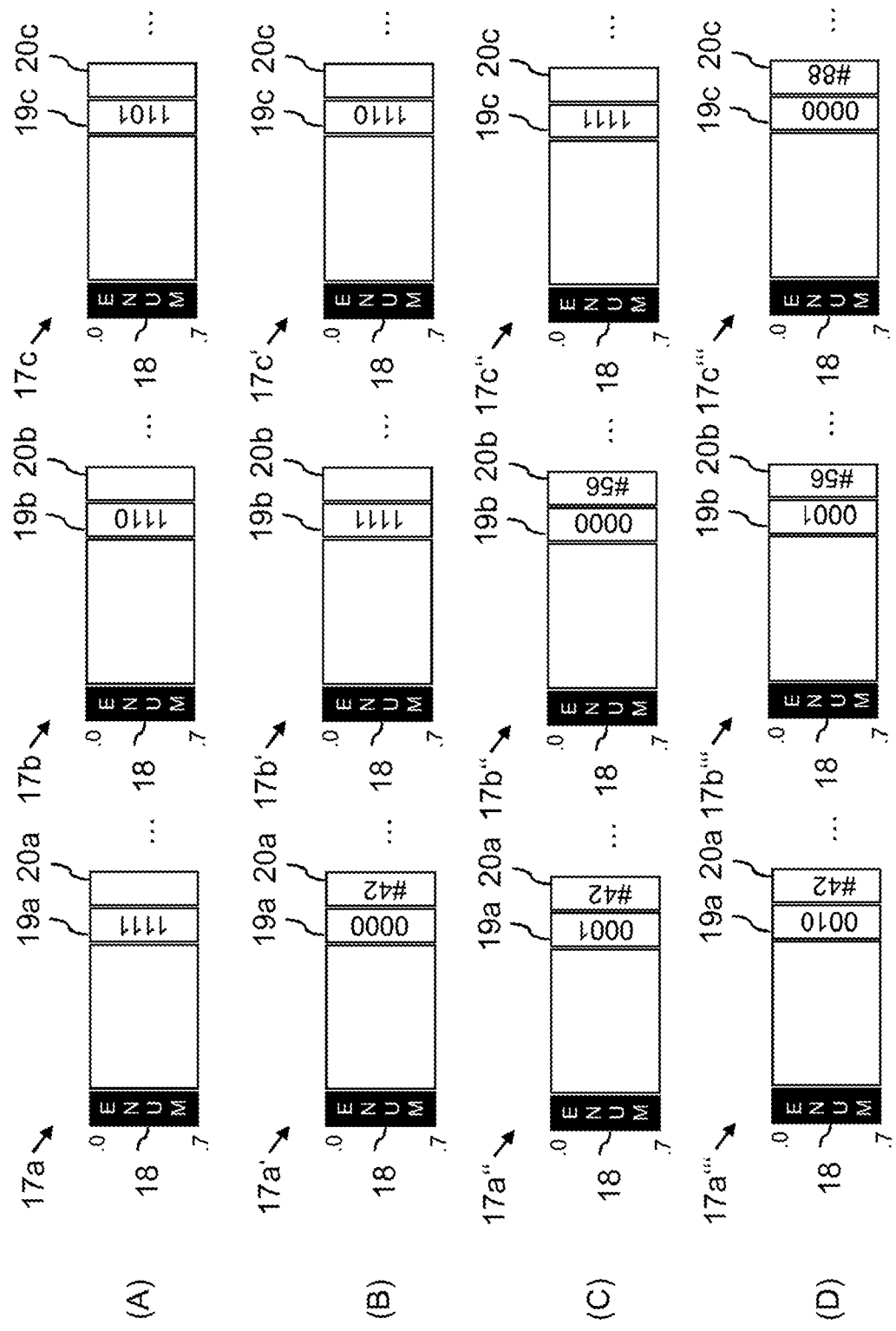

Subsequently, a plurality of second data packets 17a, 17b, 17c are generated again by the local bus master 3. The second counter values 19a, 19b, 19c of the respective data packets 17a, 17b, 17c are respectively adapted to assign the data packets 17a, 17b, 17c to the respective data bus subscribers 7a, 7b, . . . , 7n in sequence. This is shown in FIGS. 7a and 7b.

The local bus master 3 adjusts the second counter value 19a, 19b, 19c of the respective data packets 17a, 17b, 17c so that they differ by a value of one and the first data packet 17a has the highest second counter value 19a. The data packets 17a, 17b, 17c are sent in symbol form to the local bus 6. This is indicated by the data packets 17a, 17b, 17c at position (A) of the local bus 6. The data bus subscriber 7a receives the data packets 17a, 17b, 17c and increases the second counter value 19a, 19b, 19c of the respective data packets 17a, 17b, 17c. In the case of data packet 17a, the data bus subscriber 7a recognizes a zero crossing when increasing the second counter value 19a and recognizes that this data packet 17a is directed to the data bus subscriber 7a. The data bus subscriber 7a writes its address #42 into the following field 20a of data packet 17a. The data packets 17a', 17b', 17c' are forwarded from the data bus subscriber 7a to the data bus subscriber 7b. This is indicated by the data packets 17a', 17b', 17c' at position (B) of the local bus 6. This data bus subscriber 7b also increases the second counter values 19a, 19b, 19c of the respective data packets 17a', 17b', 17c' and detects a zero crossing in the second counter value 19b for the data packet 17b'. As a result, the data bus subscriber 7b recognizes that the data packet 17b' is directed to the data bus subscriber 7b. The data bus subscriber 7b writes its address #56 into the subsequent field 20b of data packet 17b'. The data packets 17a", 17b", 17c" are forwarded from the data bus subscriber 7b to the data bus subscriber 7n. This is indicated by the data packets 17a", 17b", 17c" at position (C) of the local bus 6.

This data bus subscriber 7n also increases the second counter values 19a, 19b, 19c of the respective data packets 17a", 17b", 17c" and detects a zero crossing of the second counter value 19c in the data packet 17c". In this way, the data bus subscriber 7n recognizes that the data packet 17c" is directed to the data bus subscriber 7n.

The data bus subscriber 7n accordingly writes its address #88 into the subsequent field 20c of the data packet 17c". The data packets 17a''', 17b''', 17c''' are returned to the local bus master 3 from the data bus subscriber 7n. This is indicated by the data packets 17a''', 17b''', 17c''' at position (D) of the local bus 6.

After receiving the data packets 17a''', 17b''', 17c''', the local bus master 3 knows the addresses of the data bus subscribers 7a, 7b, . . . , 7n, namely #42, #56, #88. The local bus master 3 may also verify whether new data bus subscribers have become communication-ready in the meantime, for example by determining whether the second counter value 19c of the last data packet 17c''' is zero or deviates. If the second counter value 19c of the last data packet is 17c'''' is zero, the address information in the data packets is valid. If not, the count is repeated and the method starts over.

After verifying the address information in the data packets 17a''', 17b''', 17c''' by determining whether the second counter value 19c of the last data packet 17c''' is zero, the local bus master 3 may be adapted to resend at least a first data packet 17 to re-count all data bus subscribers 17a, 17b, 17c and verify that the number of communication-ready data bus subscribers 7a, 7b, . . . , 7n has not changed.

Although only the exchange of address information is described here, the skilled person understands that other data may also be exchanged with the local bus master 3 in the manner shown. The skilled person also understands that the described methods may be used by the local bus master 3 during an initialization of the local bus 6, to collect information about the communication-ready data bus subscribers 7a, 7b, . . . , 7n, even if the addresses of these data bus subscribers 7a, 7b, . . . , 7n are not known, while the second counter value 19 may be used for relative addressing of the data packets.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for communication with data bus subscribers connected to a local bus, in particular a ring bus, with a local bus master, the method comprising:

sending a first data packet from the local bus master to all data bus subscribers for counting communication-ready data bus subscribers in an order, the first data packet having a first counter value that each of the communication-ready data bus subscribers in sequence change; and sending a plurality of second data packets from the local bus master to all data bus subscribers, the plurality of second data packets is based on the first counter value and wherein each of the second data packets is assigned to one of the communication-ready data bus subscribers based on the respective relative position of the communication-ready data bus subscribers in the sequence.

2. The method according to claim 1, wherein each of the second data packets has a second counter value for assignation, wherein each of the communication-ready data bus subscribers in sequence changes the second counter value, and wherein starting values of the second counter value differ for each of the second data packets.

3. The method according to claim 1, further comprising: processing every second data packet by each of the communication-ready data bus subscribers, wherein the second data packets are processed in succession.

4. The method according to claim 3, wherein the processing additionally comprises: each of the communication-ready data bus subscribers changing the second counter value in each of the second data packets.

5. The method according to claim 4, additionally comprising: each of the communication-ready data bus subscribers comparing the second counter value in each of the second data packets with a reference value.

6. The method according to claim 5, additionally comprising: writing information stored in a data bus subscriber into a field of one of the second data packets if a current second counter value of the current second data packet corresponds to the reference value.

7. The method according to claim 1, wherein the first counter value and/or second counter value is a binary value.

8. The method according to claim 1, additionally comprising: comparing the first counter value and/or second counter value of at least one of the second data packets with an expected value after the at least one of the second data packets has been processed by each of the communication-ready data bus subscribers.

9. The method according to claim 8, wherein the expected value is based on the first counter value of the first data packet after each of the communication-ready data bus subscribers has processed the first data packet.

10. The method according to claim 8, additionally comprising: re-sending a first data packet to all data bus subscribers if the comparison shows a deviation.

11. The method according to claim 10, additionally comprising: re-sending a plurality of second data packets, wherein the number thereof is based on the first counter value of the re-sent first data packet after the re-sent first data packet has been processed by each of the communication-ready data bus subscribers.

12. A local bus master of a local bus, in particular of a ring bus, with data bus subscribers, the local bus master comprising:
a transmitter to send a first data packet to all data bus subscribers for counting communication-ready data bus subscribers in a sequence, the first data packet having a first counter value for each communication-ready data bus subscriber in sequence to change this first counter value;
a receiver to receive the first data packet having the first counter value that each communication-ready data bus subscriber has changed; and
a second transmitter to send a plurality of second data packets, the number thereof being based on the first counter value of the received first data packet, each of the second data packets being assigned to one of the communication-ready data bus subscribers based on the respective relative position of the communication-ready data bus subscribers in the sequence.

13. A local bus system, comprising:
a local bus or a ring bus;
a local bus master according to claim 12 and
at least one data bus subscriber.

14. A method for communication with a local bus master of a local bus, in particular of a ring bus, with communication-ready data bus subscribers, the method comprising:
receiving at a communication-ready data bus subscriber a first data packet from a local bus master, the first data packet having a first counter value;
changing the first counter value in the first data packet by the communication-ready data bus subscriber;
receiving a plurality of second data packets; and
writing information stored in the communication-ready data bus subscriber into a field of one of the second data packets when the second data packet is assigned to the communication-ready data bus subscriber.

15. A communication-ready data bus subscriber of a local bus, in particular a ring bus, having a local bus master, the communication-ready data bus subscribers comprising:
a receiver to receive a first data packet from the local bus master, the first data packet having a first counter value;
a counter to change the first counter value in the first data packet;
a second receiver to receive a plurality of second data packets; and
a writer to write information stored in the communication-ready data bus subscriber into a field of one of the second data packets if the second data packet is assigned to the communication-ready data bus subscriber.

* * * * *